(12) United States Patent
D'Angelo

(10) Patent No.: US 6,439,037 B1
(45) Date of Patent: Aug. 27, 2002

(54) DYNAMOMETER HAVING IMPROVED SENSING CONFIGURATION

(76) Inventor: Severino D'Angelo, 335 Cajon Ter., Laguna Beach, CA (US) 92651

( * ) Notice: Subject to any disclaimer, the term of this patent is extended or adjusted under 35 U.S.C. 154(b) by 0 days.

(21) Appl. No.: 09/606,722

(22) Filed: Jun. 29, 2000

(51) Int. Cl.[7] .......................... G01M 15/00; G01L 3/16
(52) U.S. Cl. ....................................................... 73/117
(58) Field of Search ............................... 73/117, 117.3, 73/123, 862.08, 862.05

(56) References Cited

U.S. PATENT DOCUMENTS

| | | | | |
|---|---|---|---|---|
| 3,757,909 A | * | 9/1973 | McClure | |
| 3,818,754 A | * | 6/1974 | Asmus | 73/862.16 |
| 4,062,233 A | * | 12/1977 | Bonomo | 73/862.11 |
| 4,077,255 A | | 3/1978 | Murakami | |
| 4,161,116 A | * | 7/1979 | Fegraus et al. | 73/117 |
| 4,327,578 A | * | 5/1982 | D'Angelo | 73/117 |
| 4,450,728 A | * | 5/1984 | D'Angelo et al. | 73/117 |
| 4,688,419 A | * | 8/1987 | D'Angelo et al. | 73/862.09 |
| 4,706,507 A | * | 11/1987 | D'Angelo | 73/862.08 |
| 5,311,770 A | * | 5/1994 | D'Angelo | 73/117 |
| 5,345,827 A | * | 9/1994 | Brassert et al. | 73/862.15 |
| 5,385,042 A | * | 1/1995 | La Belle | 73/117 |
| 5,445,013 A | * | 8/1995 | Clayton, Jr. et al. | 73/117 |
| 5,452,605 A | * | 9/1995 | Wilson et al. | 73/117 |
| 5,522,257 A | | 6/1996 | D'Angelo et al. | |
| 5,844,145 A | * | 12/1998 | D'Angelo | 73/862.18 |
| 5,861,552 A | * | 1/1999 | Clayton, Jr. et al. | 73/117 |
| 5,955,662 A | * | 9/1999 | D'Angelo | 73/117 |

* cited by examiner

Primary Examiner—Eric S. McCall
(74) Attorney, Agent, or Firm—Harness, Dickey & Pierce, P.L.C.

(57) ABSTRACT

A dynamometer apparatus having an inside-out motor and a measurement loop which is defined by a load cell. The inside-out motor includes a generally hollow stator shaft through which the motor power cables are festooned. A first set of bearings, located within the measurement loop, support the rotor of the inside-out motor for rotation on the stator shaft. The stator shaft is independently supported on a base structure by a second set of bearings, with the second set of bearings supporting the full weight of the inside-out motor.

19 Claims, 4 Drawing Sheets

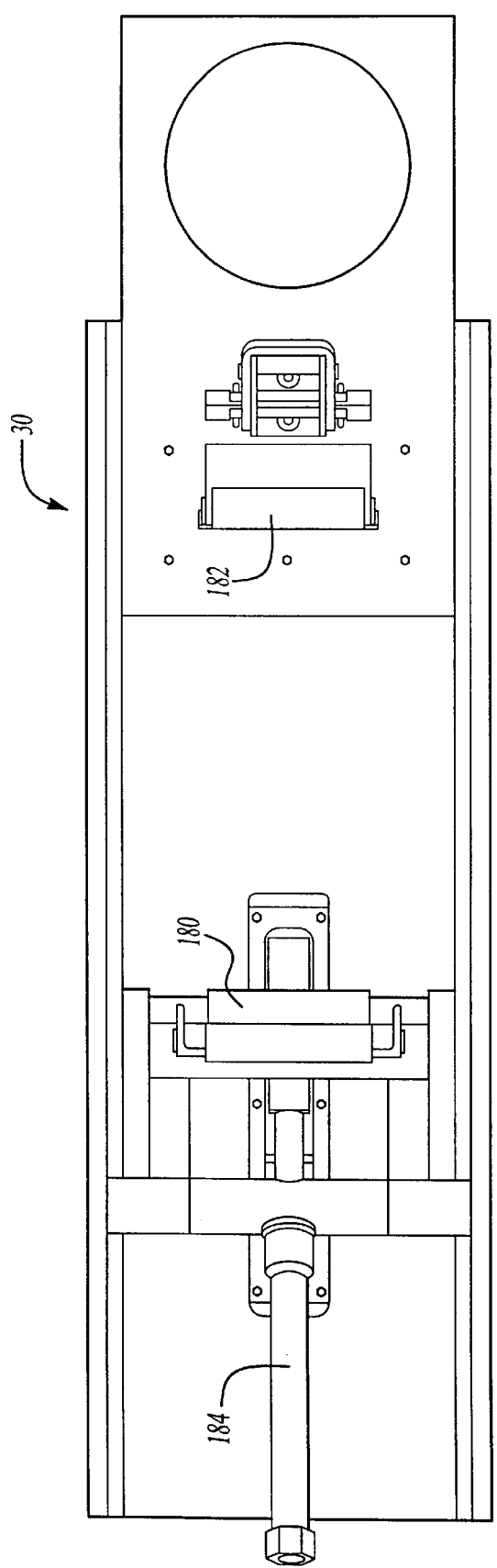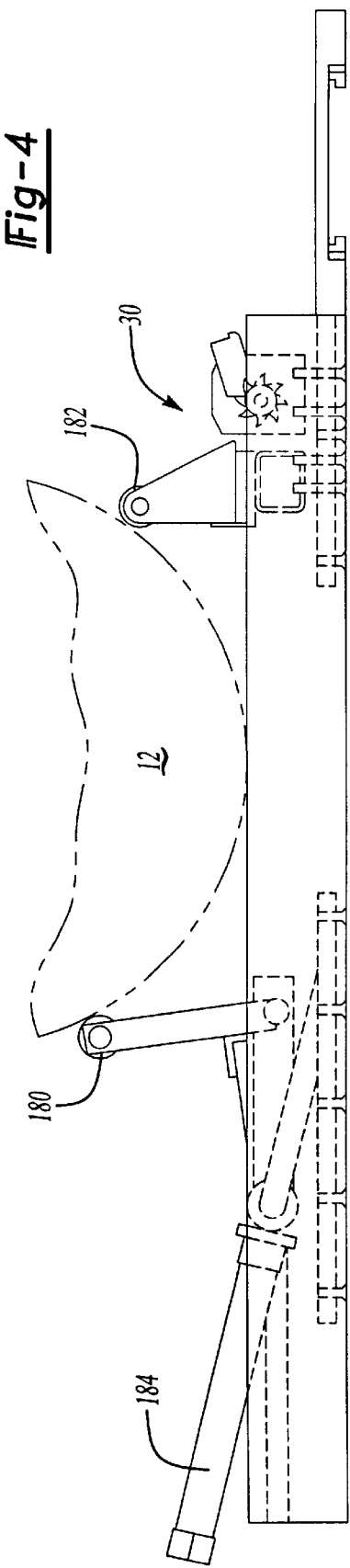
Fig-4
Fig-5

DYNAMOMETER HAVING IMPROVED SENSING CONFIGURATION

1. Technical Field

The present invention relates generally to high performance dynamometers and more particularly to a roller-type chassis dynamometer having improved the accuracy and repeatability.

2. Discussion

Various roller-type chassis dynamometers have been proposed for inspecting the functions and for monitoring the performance of devices such as automotive vehicles. It is well known in the art that frictional forces acting on the dynamometer can affect the accuracy of the measurements made by the dynamometer. Accordingly, significant resources have been expended to reduce the magnitude of such forces so as to improve the accuracy of the dynamometer.

The efforts in this area primarily focus on the mechanics of the dynamometer structure and the elimination of frictional forces, with the goal being the elimination or quantification of the frictional forces acting upon the dynamometer structure. Despite several recent innovations, the magnitude of the forces acting on the dynamometer structure that affect the accuracy and repeatability of conventional dynamometers remains at a significant level. Complicating matters is that these forces tend to be non-linear (i.e., not proportional to the load applied to the dynamometer) and can vary greatly in magnitude between similarly configured dynamometers. Consequently, it is typically not possible to accurately predict the magnitude of these forces and apply a simple software offset to remove the error associated with the force, rendering it extremely difficult to accurately perform certain tests, such as the monitoring of a vehicle's tire or drive train losses.

One factor which greatly affects the accuracy and repeatability of the dynometer is related to the manner in which the rotor of the dynamometer is supported. Many conventional dynomometers are designed in a manner wherein frictional forces acting on the rotor of the dynometer are not within a monitored torque or measurement loop (i.e., the frictional forces which resist the rotation of the rotor are not cumulatively monitored by the dynamometer measurement loop or system).

Furthermore, as the magnitude of the frictional forces acting on the dynamometer can vary greatly between otherwise identical dynamometers, a significant portion of the variation in the accuracy and repeatability of the dynomometers stems from factors related to their installation. Research has shown that the manner in which the cables and/or hoses are festooned (i.e., routed and supported) to the dynamometer can account for a significant portion of the variation in the forces that affect the accuracy and repeatability of dynamometer measurements.

In this regard, the wires of a conventional dynomometer that couple a control panel to the stator essentially apply a force to the stator that resists rotation of the stator. The force applied by the wire harness results from its unsupported weight that is transmitted to the stator, as well as its resistance to bending. While these forces tend to be small in most situations, the fact that they are typically applied to an exterior surface of the dynomometer stator results in a torque moment that multiplies the effect of these forces several times over. Accordingly, there remains a need in the art for a roller-type chassis dynamometer having a configuration which permits improved accuracy and repeatability.

SUMMARY OF THE INVENTION

It is a general object of the present invention to provide a dynamometer apparatus which provides measurements that are more accurate and repeatable.

It is a more specific object of the present invention to provide a dynamometer apparatus which festoons the motor power cables so as to improve the accuracy and repeatability of the dynamometer apparatus.

In one preferred form, the present invention provides a dynamometer apparatus having a roller, an inside-out motor, a measurement loop and a controller for controlling the inside-out motor. The inside-out motor includes a stator, a first set of bearings and a rotor. The stator includes a stator shaft which extends through the rotor and which includes a generally hollow cavity. The rotor is coupled to the roller. The first set of bearings support the rotor and the roller for rotation on the stator shaft about the longitudinal axis of the stator shaft. The measurement loop is established by a load cell which is operatively coupled to the stator shaft. The measurement loop is configured in a manner such that the first set of bearings are within the measurement loop. A plurality of wires couple the controller and the stator wherein the plurality of wires are coupled to the stator at a first end and extend out of the hollow cavity. A second set of bearings couple a base structure and the stator shaft wherein the second set of bearings supports the stator shaft for rotation about a stator axis.

BRIEF DESCRIPTION OF THE DRAWINGS

Additional advantages and features of the present invention will become apparent from the subsequent description and the appended claims, taken in conjunction with the accompanying drawings, wherein:

FIG. 4 is a plan view of a portion of the dynamometer apparatus of FIG. 1 illustrating one of the tire centering assemblies;

FIG. 5 is a side elevational view of the tire centering assembly of FIG. 4; and

DETAILED DESCRIPTION OF THE PREFERRED EMBODIMENT

Figure 1:
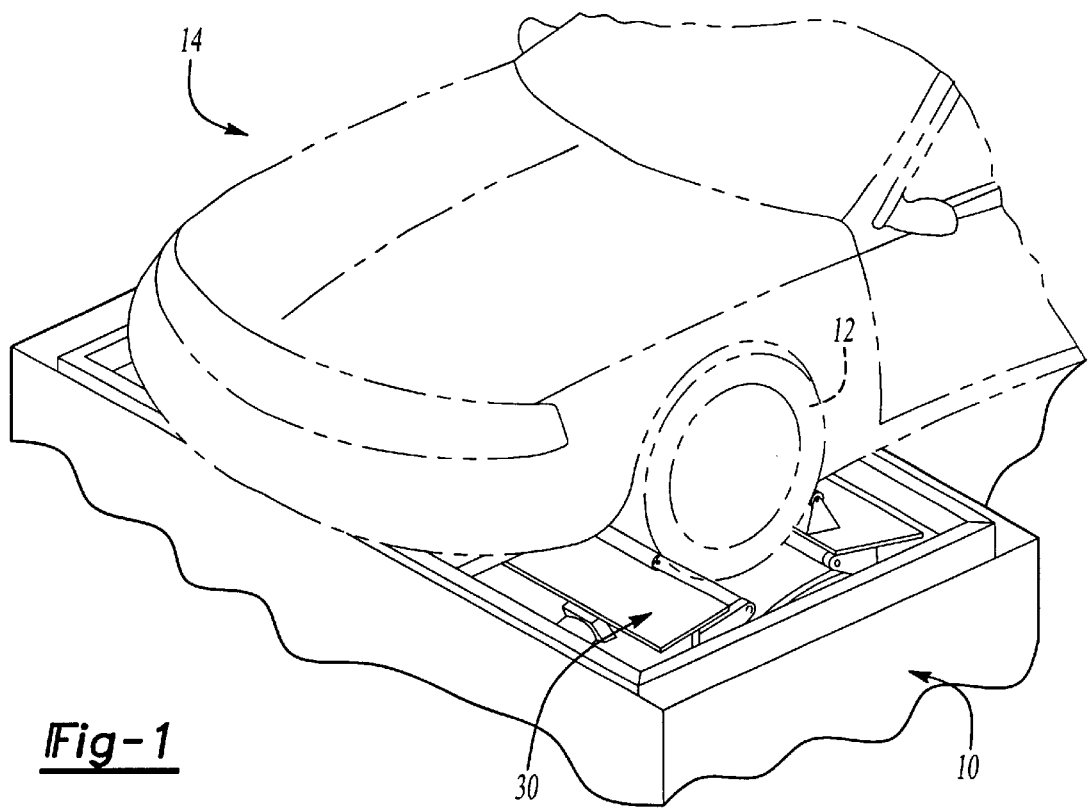
FIG. 1 is a perspective view of a front portion of a vehicle showing the driven wheels thereof being supported by the rolls of the dynamometer apparatus of the present invention, with the dynamometer apparatus being installed in a pit formed in a floor.
Figure 2:
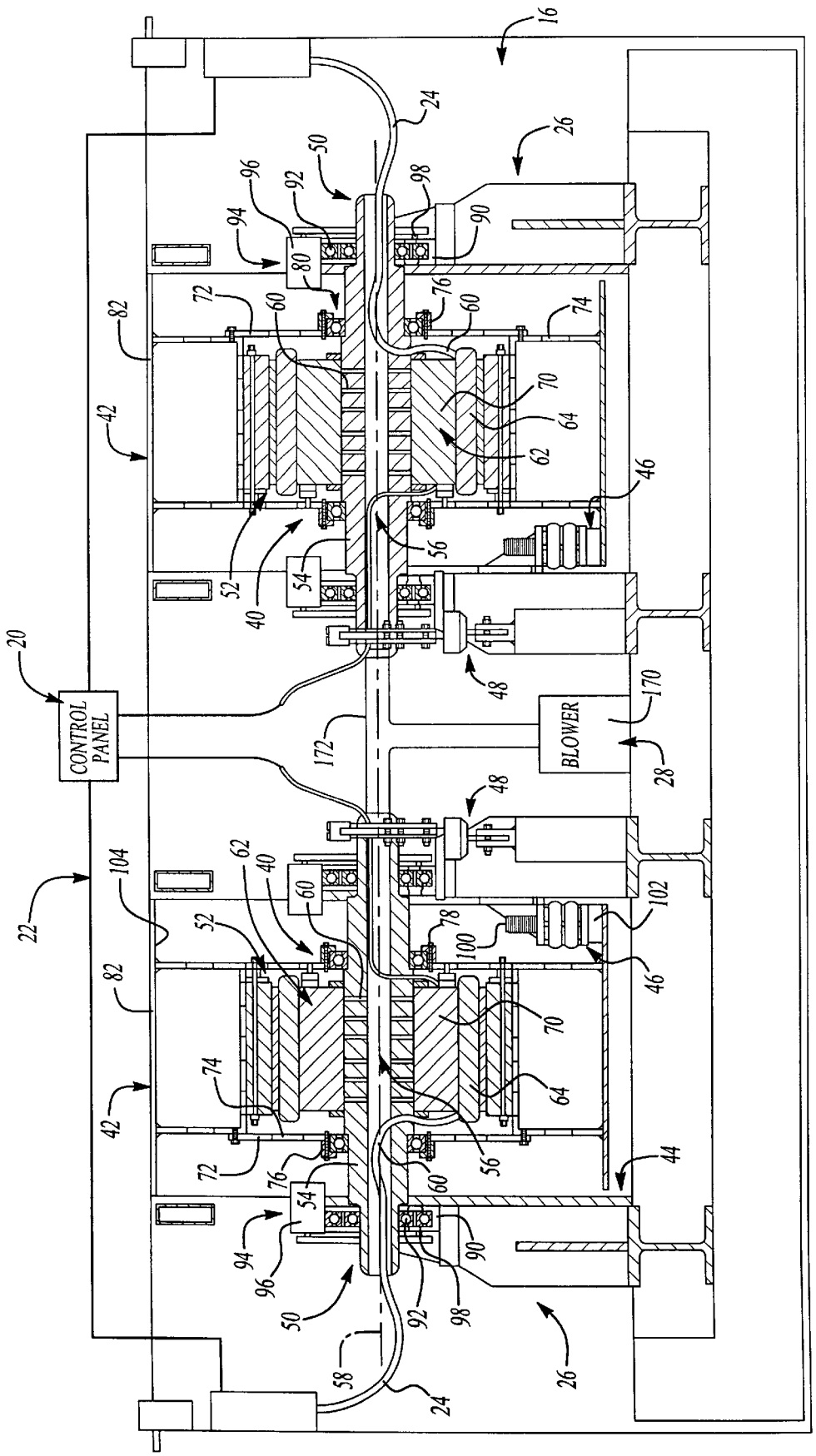
FIG. 2 is a cross-sectional view of a portion of the dynamometer apparatus of FIG. 1 taken along the longitudinal axis of the stators.

In FIGS. 1 and 2, a roller-type dynamometer apparatus constructed in accordance with the teachings of a preferred embodiment of the present invention is generally indicated by reference numeral 10. Dynamometer apparatus 10 is illustrated to be in operative association with the driven wheels 12 of a vehicle 14. Dynamometer apparatus 10 is located in a pit 16 and includes a control panel 20, a wire harness 22 (including motor power wires 24), a pair of dynamometer mechanisms 26, a blower apparatus 28 and a pair of tire centering assemblies 30.

Each dynamometer mechanism 26 includes an inside-out motor 40, a roller 42, a base structure 44, a brake mechanism 46 and a measurement loop 48. Inside-out motor 40 includes a stator 50 and a rotor 52. Stator 50 includes a stator shaft 54 having a hollow cavity 56 that is preferably formed along an axis that coincides with the stator axis 58. A plurality of wire apertures 60 are formed through stator shaft 54, each wire aperture 60 being generally perpendicular to stator axis 58. A plurality of magnetic poles 62 are fixedly coupled to stator shaft 54 and disposed radially thereon. A magnetic pole piece 64 is coupled to the distal end of each of the magnetic poles 62. An exciting coil 70 having a pair of motor power leads 24 is wound around the magnetic poles 62. Leads 24 extend through wire apertures 60 into hollow cavity 56 and are subsequently coupled to wire harness 22.

Rotor 52 is circumferentially disposed about the magnetic poles 62, having a generally U-shaped cross-section with a pair of annular end walls 72. Each of the annular end walls 72 includes a plurality of circumferentially spaced ventilation apertures 74, the purpose of which will be discussed in detail, below. A bearing flange 76 is fixedly but releasably coupled to each of the annular end walls 72 via a plurality of bolts 78. Bearing flanges 76 are employed to capture a set of first bearings 80 which support rotor 52 for rotation on stator shaft 54.

Roller 42 includes a roller member 82 which is circumferentially disposed about rotor 52 and operable for receiving a torque input from a respective one of the driven wheels 12. Roller 42 is fixedly coupled to rotor 52 such that roller 42 and rotor 52 commonly rotate about stator shaft 54. Roller member 82 preferably extends laterally outboard of rotor 52 so as to accommodate brake mechanism 46 in a manner which will be discussed in detail, below.

Base structure 44 includes a pair of support trunnions 90 into which a second set of bearings 92 are incorporated. Preferably, the second set of bearings 92 are motor bearings 94. A detailed description of motor bearings 94 is beyond the scope of the present invention and need not be provided herein. Briefly, motor bearings 94 include a rotary drive 96 which is operable for rotating the race 98 of each of the motor bearings 94 at a predetermined velocity (i.e., rotational speed and direction) so that the frictional forces associated with the motor bearings 94 may be more accurately quantified and/or canceled out. Motor bearings 94 are described in more detail in U.S. Pat. No. 5,522,257 entitled "Suspended Single Roll Dynamometer", the disclosure of which is hereby incorporated by reference as if fully set forth herein.

Brake mechanism 46 includes a stationary portion 100, which is fixedly coupled to base structure 44 and an engaging portion 102. Engaging portion 102 is selectively actuatable for contacting the inner surface 104 of roller member 82 to exert a frictional force thereon to resist the rotation of roller 42 and rotor 52. Engaging portion 102 is normally maintained at a predetermined distance away from inner surface 104 to prevent inadvertent contact between brake mechanism 46 and roller 42 that would affect the accuracy and repeatability of dynamometer apparatus 10.

Figure 3:
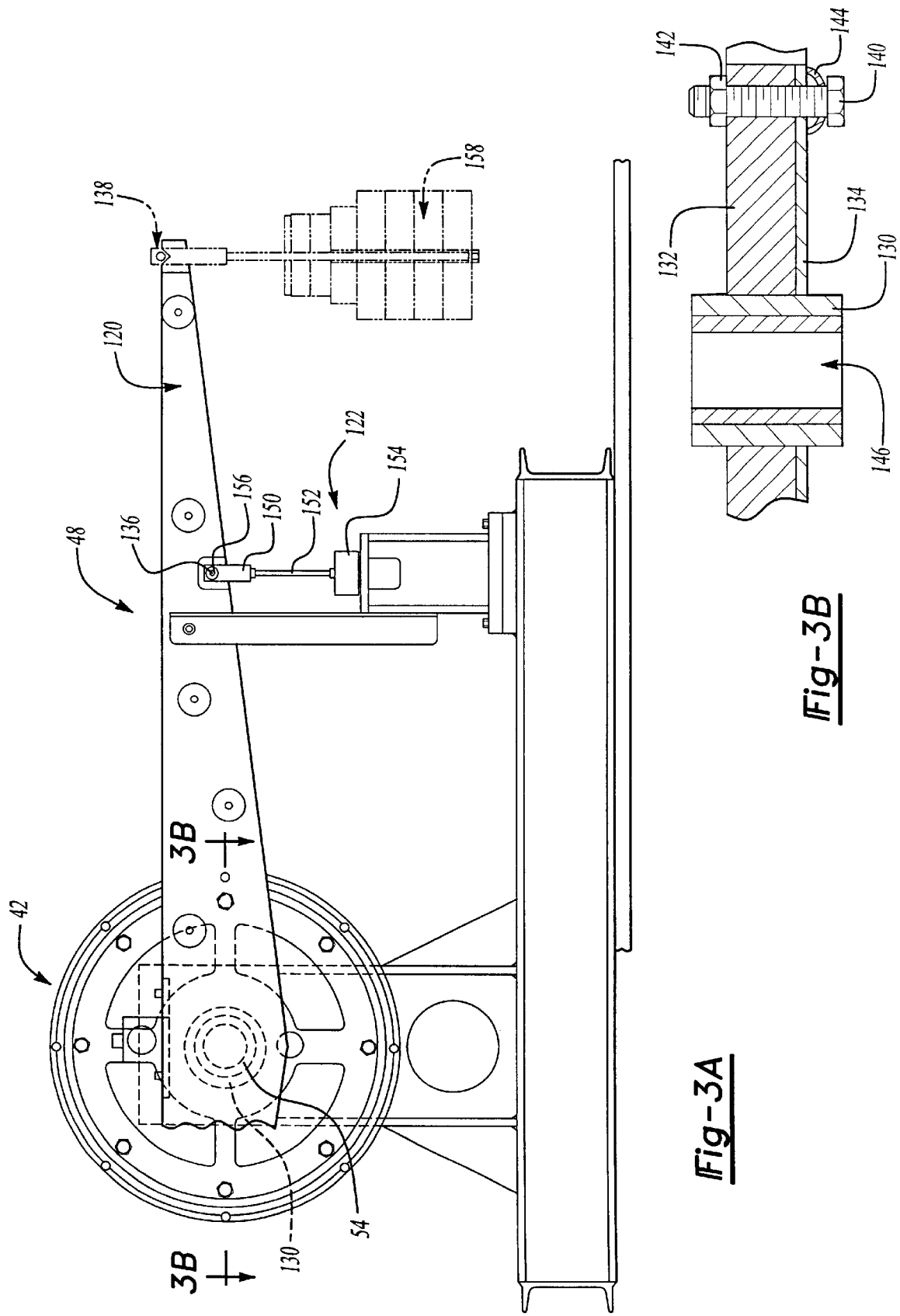
FIG. 3 is an end elevational view of a portion of the dynamometer apparatus of FIG. 1.

With additional reference to FIGS. 3A and 3B, measurement loop 48 is shown to include a torque arm assembly 120 and a force measurement device 122. Torque arm assembly 120 is shown to include a hub 130, a torque arm structure 132 and a vibration damper structure 134. Torque arm structure 132 includes a measurement device attachment aperture 136 and a calibration detent 138. A plurality of threaded fasteners 140 and self-locking nuts 142 which extend through spherically-shaped Belville washers 144 are employed to couple vibration damper structure 134 to torque arm structure 132. Hub 130 includes a central aperture 146 which extends longitudinally therethrough. Hub 130 extends through and is fixedly coupled to both vibration damper structure 134 and torque arm structure 132.

Hub 130 is engaged to stator shaft 54 to fixedly couple torque arm assembly 120 to stator 50 in a manner which inhibits relative movement therebetween. Examples of suitable manners in which hub 130 is coupled to stator shaft 54 include press-fitting or shrunk-fitting hub 130 to stator shaft 54, keying hub 130 to stator shaft 54, and/or employing one or more fasteners to exert a clamping force which is transmitted between hub 130 and stator shaft 54. The manner in which hub 130 is coupled to stator shaft 54 preferably permits torque arm assembly 120 to be removed from stator shaft 54 to permit the servicing of dynamometer mechanism 26.

Force measurement device 122 is illustrated to include a mounting yoke 150, an attachment rod 152 and a load cell 154. A fastener, such as a conventional shoulder bolt 156, is employed to pivotably couple mounting yoke 150 to torque arm structure 132. Load cell 154 is fixedly but releasably coupled to base structure 44 and electrically coupled to control panel 20. Attachment rod 152 couples mounting yoke 150 and load cell 154, permitting forces to be transmitted therebetween. Load cell 154 is conventionally operable for monitoring the load transmitted thereto and producing a load cell signal in response thereto. The load cell signal is received by control panel 20 which employs the load cell signal to calculate the magnitude of the torque that is transmitted through measurement loop 48 (i.e., the magnitude of the torque that is transmitted between the roller 42 and stator shaft 54). The calibration of load cell 154 is verified in a manner that is well known in the art by hanging a known weight 158 from calibration detent 138 so as to apply a load of a known magnitude to load cell 154.

As improved accuracy and repeatability is a specific object of the present invention, it is critical that the first set of bearings 80 which support roller 42 and rotor 52 for rotation on stator shaft 54 be within within measurement loop 48. Furthermore, stator shaft 54 must be independently supported by the second set of bearings 92, which in turn support the full weight of inside-out motor 40. Advantageously, construction in this manner permits the frictional forces which tend to resist the rotation of rotor 52 and roller 42 to develop an equal and opposite reaction force that is transmitted to stator shaft 54. Accordingly, frictional forces associated with the first set of bearings 80, in combination with the other rotational forces applied against stator shaft 54, are within measurement loop 48 and monitored by load cell 154.

Another critical aspect of the present invention is that wire harness 22 is routed through hollow cavity 56. In this regard, the force that exerted by wire harness 22 (i.e., as a result of the unsupported weight of wire harness 22 or the resistance of wire harness 22 to bend or deflect) which tends to resist the rotation of stator shaft 54 is applied at or relatively close to the stator axis 58. Consequently, the torque moment produced by the forces associated with the bending and festooning of the wire harness 22 are significantly smaller than those associated with conventional dynamometers.

Construction of dynamometer apparatus 10 in this manner yields a highly accurate and repeatable dynamometer which is particularly well suited for monitoring the transmission of torques that are relatively low in magnitude, such as the monitoring of tire and drivetrain losses. However, those skilled in the art will understand that the applications of dynamometer apparatus 10 need not be limited to the monitoring of the transmission of torques that are relatively low in magnitude, but may also be utilized for other, more conventional situations such as emissions measurements.

Returning to FIG. 2, dynamometer apparatus 10 is shown to include blower apparatus 28. Blower apparatus 28 includes a blower mechanism 170 which is fixedly coupled to base structure 44 and a duct 172. Blower mechanism 170 discharges a stream of filtered air to duct 172 which then directs the air stream into hollow cavity 56. The stream of air flows through the unused wire apertures 60, through exciter coil 70 and around poles 62 and escapes through the plurality of wire apertures 60 in rotor 52 to thereby cool inside-out motor 40 during its operation.

With reference to FIGS. 4 and 5, each of the tire centering assemblies 30 is shown to include first and second rollers 180 and 182, respectively, for rollably engage one of the driven wheels 12. As shown in FIG. 5, a pneumatic cylinder 184 is coupled to first roller 180 to pivot first roller 180 upwardly from a retracted position to trap the associated driven wheel 12 between first and second rollers 180 and 182.

Figure 6:
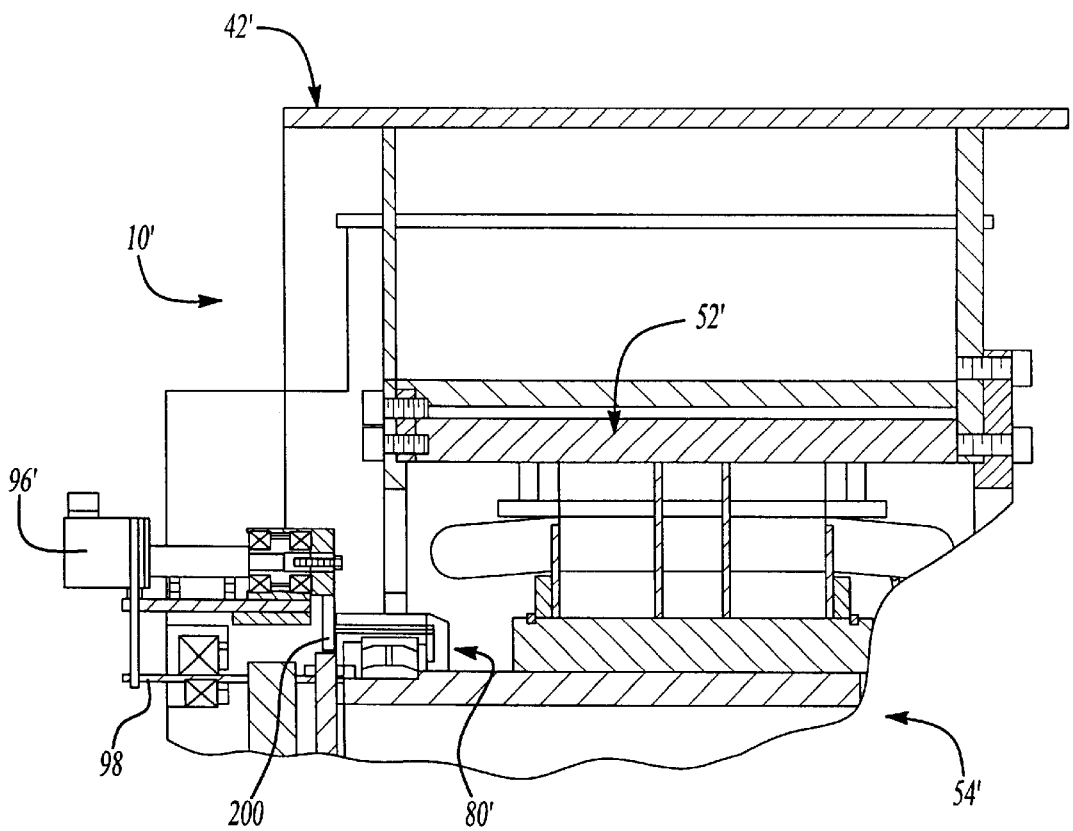
FIG. 6 is a cross-sectional view similar to that of FIG. 2 but illustrating an alternate embodiment of the present invention.

While dynamometer apparatus 10 has been described thus far as including a pair of dynamometer mechanisms 26, each of which having a first set of bearings 80 with a stationary race, those skilled in the art will appreciate that the invention, in its broader aspects, may be constructed somewhat differently. For example, the dynamometer apparatus may be constructed as shown in FIG. 6.

In this arrangement, dynamometer apparatus 10' is shown to include a single roller 42' for contacting the drive wheels 12 of vehicle 14. Roller 42' and rotor 52' are supported for rotation on stator shaft 54' via a first set of bearings 80' which are illustrated to be motor bearings. The races 200 of the first set of bearings 80' are rotated by a rotary drive 96' which is operable for rotating the race 200 of each of the first set of bearings 80' at a predetermined velocity so that the frictional forces associated with the first set of bearings 80' may be more accurately quantified and/or canceled out. Rotary drive 96' is also operable for rotating the race 98 of each of the second set of bearings 92 as discussed above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A dynamometer apparatus comprising:
   an inside-out motor having a stator, a first set of bearings and a rotor, the stator having a stator shaft that extends through the rotor, the stator shaft including a generally hollow cavity, the first set of bearings coupled to the stator shaft and supporting the rotor for rotation about the stator shaft;
   a roller coupled for rotation with the rotor;
   a measurement loop established by a load cell operatively coupled to the stator shaft, the first set of bearings being within the measurement loop;
   a controller for controlling the inside-out motor;
   a plurality of wires coupling the controller and the stator, the plurality of wires coupled to the stator at a first end and extending out of the hollow cavity;
   a base structure; and
   a second set of bearings coupled to the base structure and the stator shaft, the second set of bearings supporting the stator shaft for rotation about a stator axis.

2. The dynamometer apparatus of claim 1, wherein the second set of bearings are motor bearings.

3. The dynamometer apparatus of claim 2, wherein the first set of bearings are motor bearings.

4. The dynamometer apparatus of claim 1, wherein the hollow cavity is formed along the stator axis.

5. The dynamometer apparatus of claim 1, wherein the stator shaft includes at least one wire aperture extending through the stator shaft and intersecting the hollow cavity, the first end of the plurality of wires extending through the at least one wire aperture.

6. The dynamometer apparatus of claim 1, wherein the dynamometer apparatus includes two inside-out motors and two rollers, each one of the rollers being coupled for rotation with one of the rotors.

7. The dynamometer apparatus of claim 6, wherein the inside-out motors are spaced apart along a common axis.

8. The dynamometer apparatus of claim 7, wherein the dynamometer is configured to measure vehicle tire losses and vehicle geartrain losses.

9. The dynamometer apparatus of claim 1, wherein the measurement loop further includes a torque arm assembly, the torque arm assembly being coupled for rotation with the stator shaft, the load cell coupling the torque arm assembly with the base structure and measuring the force transmitted therebetween.

10. The dynamometer apparatus of claim 1, wherein the roller is circumferentially disposed about the rotor.

11. The dynamometer apparatus of claim 10, wherein the roller includes a roller member and a roller structure, the roller member being generally shaped in the form of a hollow cylinder, the roller structure having a radially extending member coupled to and supporting the roller member for rotation with the rotor.

12. The dynamometer apparatus of claim 11, further comprising a brake mechanism having a brake member for contacting a radially inward surface of the roller member, wherein actuation of the brake mechanism causes the brake member to transmit a frictional force to the roller member to resist the rotation of the roller.

13. The dynamometer apparatus of claim 1, wherein the plurality of wires includes a motor power wire.

14. A dynamometer comprising:
   a base structure;
   a stator having a stator shaft, the stator shaft having a generally hollow cavity;
   a rotor;
   a first set of bearings coupled to the stator shaft and the rotor, the first set of bearings supporting the rotor for rotation about the stator;
   a second set of bearings coupled to the stator shaft and the base structure, the second set of bearings supporting the stator for rotation about a stator axis;
   a measurement loop having a load cell operatively coupled to the stator shaft;
   a controller for controlling a magnetic field produced by the stator; and
   a plurality of wires coupling the controller and the stator, the plurality of wires coupled to the stator at a first end and extending outwardly from the hollow cavity in the stator shaft.

15. The dynamometer of claim 14, wherein the plurality of wires includes a motor power wire.

16. A dynamometer comprising:

an inside-out motor having a stator, a first set of bearings and a rotor, the stator having a stator shaft that extends through the rotor, the stator shaft including a generally hollow cavity disposed along a longitudinal axis of the stator shaft, the first set of bearings coupled to the stator shaft and supporting the rotor for rotation about the stator shaft;

a roller circumferentially disposed about the rotor, the roller being coupled for rotation with the rotor about the stator shaft;

a controller for controlling the inside-out motor;

at least one control wire coupling the inside-out motor and the controller, the at least one control wire being coupled to the stator at a first end and extending out of the hollow cavity;

a base structure; and a second set of bearings, the second set of bearings coupled to the base structure and supporting the stator shaft for rotation on the base structure.

17. The dynamometer of claim 16, wherein the roller and the motor form a single cylindrical assembly that is supported by the second set of bearings.

18. The dynamometer of claim 16, wherein the second set of bearings are motorized trunnion bearings.

19. The dynamometer of claim 16, wherein the rotor is fixedly coupled to an interior surface of the roller.

\* \* \* \* \*